United States Patent [19]

Kaufmann

[11] Patent Number: 4,492,416
[45] Date of Patent: Jan. 8, 1985

[54] CABLE WHEEL MOUNTING FOR CABLE CARS

[75] Inventor: Erich Kaufmann, San Leandro, Calif.

[73] Assignee: D. W. Nicholson Corporation, San Leandro, Calif.

[21] Appl. No.: 485,951

[22] Filed: Apr. 18, 1983

[51] Int. Cl.³ .............................................. F16C 19/30
[52] U.S. Cl. .................................... 384;474; 384/481; 384/618
[58] Field of Search ...................... 308/187, 208, 187.1, 308/230, 209, 227; 384/380

[56] References Cited

U.S. PATENT DOCUMENTS

| | | | |
|---|---|---|---|
| 1,747,744 | 2/1930 | Venable | 384/380 |
| 2,859,075 | 11/1958 | Hobbs et al. | 308/208 |
| 4,408,808 | 10/1983 | Redmann et al. | 308/187 |

Primary Examiner—Lenard A. Footland
Attorney, Agent, or Firm—Manfred M. Warren; Robert B. Chickering; Glen R. Grunewald

[57] ABSTRACT

The wheel mounting of the present invention is designed particularly for use in cable car structures at intersecting street corners, that is, where the cable is carried around a curve. The structure comprises, briefly, a pair of normally vertically spaced horizontally extending supporting pleats and a vertical shaft fixed to the plates and which journals a cable supporting wheel, the later being thus normally mounted to rotate in a horizontal plane. The structure is intended for mounting in below ground surface at the elevation of and to support the car driving cable. Of particular importance is the provision in mounting of a bearing in the wheel hub surrounding the shaft and which has an outer race at the hub wall of the wheel and an inner race at the shaft, the two races being rigidly clamped to the hub and shaft so as to positively confine the forces imposed on the bearing to those forces which the bearing is designed to withstand without undue heating, wear or deterioration. At the same time the structure provides for easy and rapid lubrication of the bearing and for the retention of lubricant therein thus requiring minimal servicing.

11 Claims, 2 Drawing Figures

CABLE WHEEL MOUNTING FOR CABLE CARS

BACKGROUND OF THE INVENTION

Cable cars are driven by gripping a moving cable commonly positioned beneath the surface of a street and supported for movement in proper position on a series of sheaves or pulley wheels. The later must be maintained in free running condition and for this purpose a team of workmen are required to continuously monitor operation, lubricate wheel bearings and replace malfunctioning cable supporting wheels. The problem is particularly aggravated at street intersections where cable cars are directed around corners and extra loads are accordingly placed on the cable supporting wheels. Despite substantial and continuous attention, existing cable supporting wheel assemblies have had a limited life and must be not only constantly lubricated but removed from the street and replaced—a time consuming and costly operation. A number of different bearing configurations have been proposed for overcoming the foregoing problems, but none to applicant's knowledge have been successful.

SUMMARY OF INVENTION

The wheel mounting of the present invention uses roller bearings that are rigidly preset in the mounting assembly so that the cable system and loads imposed thereon cannot place undue extra force on the bearings causing inordinate heating and premature wear and deterioration of the bearings. The mounting, structure and orientation of the bearings is such that they are not required under any circumstance to resist loads for which they are not designed. On the contrary, the mounting of the present invention confines the load on the bearings to loads for which the bearings are designed and capable of functioning substantially indefinitely.

Another feature of the present invention is to provide a wheel mounting of the character described which is self-lubricating and requires virtually no monitoring and only minimum, spaced out, addition of lubricant which can be quickly and easily effected.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF INVENTION

Figures 1, 2:
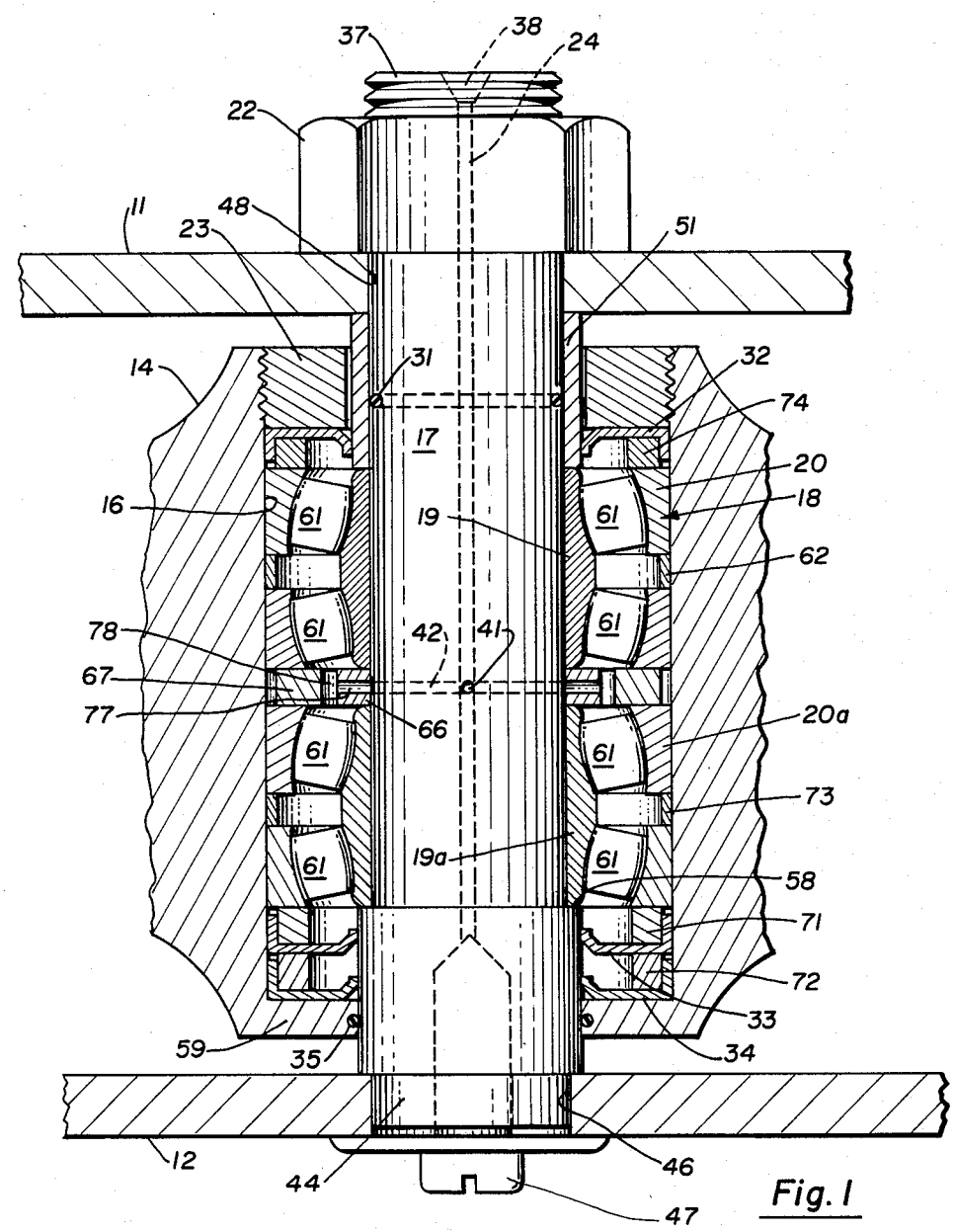
FIG. 1 is a cross-sectional view of a cable wheel mounting for cable cars, constructed in accordance with the present invention.
FIG. 2 is an elevational view on a somewhat smaller scale of the wheel mounting.

The pulley of the present invention is designed particularly for use in cable car structures at intersecting street corners, that is, where the cable is carried around a curve by a wheel assembly of the present invention. As the cable car approaches one of these corners, the grip man releases the cable permitting the cable car to move on its own inertia around the corner when the cable is regripped for moving the cable car. Typically the cable wheel is about 18 inches in diameter and is mounted to rotate in a horizontal plane for supporting the cable which is also supported on periodically spaced rollers mounted along the run of the cable.

With reference to the accompanying drawing, the cable wheel mounting for cable cars of the present invention comprises, briefly, a wheel mounting having a pair of spaced apart supports 11 and 12 and a wheel 13 having a hub 14 formed with an internal wall 16 journaled for rotation on a shaft 17 mounted on supports 11 and 12, the improvement including a bearing 18 having an inner race 19 surrounding shaft 17 and an outer race 20 adjacent hub wall 16 and a chamber between the races; means 22 clamping inner race 19 to shaft 17; means 23 clamping outer race 20 to hub 14; conduit means 24 positioned for introducing lubricating oil to the space between the inner and outer bearing races; and means, see sealing rings 31, 32, 33, 34 and 35 providing oil retention in the bearing.

As hereinabove noted, shaft 17 is normally mounted in use on a vertical axis by supporting members 11 and 12 which typically comprise a pair of steel plates which are supported in spaced apart parallel relation by brackets 26 inserted between the plates adjacent their opposite ends. The plates thus support the whole assembly which is mounted as a unit in a cutout portion of the street arranged to position wheel 13 for rotation in a substantially horizontal plane at the desired elevation for supporting the traction cable 36. In this mounting of the parts, the normally upper end of shaft 17 is readily accessible to workmen and the aforementioned conduit 24 is extended to upper shaft end 37 and is provided with an oil receiving opening 38 thereat for gravitional flow of oil through conduit 24 which here extends downwardly, axially, longitudinally of shaft 17 and is provided with at least one radially extending passage 41 for discharge of oil into the space between races 19 and 20. As here shown, additional radial passages 42 are provided in shaft 17 at substantially right angles to passage 41.

In the present construction the shaft 17 has its normally lower end 44 extended through the lower supporting plate 12 and is rigidly secured to the plate in perpendicular relation by a stepped construction of the shaft with a reduced lower end 44 mounted in a receiving opening 46 in plate 12, and the shaft held fixed in the position illustrated by a screw 47. The opposite, upper, end 37 of the shaft is extended through an opening 48 in the top plate 11 and is here secured by a nut (means 22) threaded onto the upper threaded end 37 of the shaft. A sleeve 51 is mounted in surrounding relation to the shaft and has its opposite ends positioned in abutment with the underside of mounting plate 11 and the top side of inner race 19. Accordingly, sleeve 51 will take up any slack between top supporting plate 11 and the inner bearing race for clamping the race to shaft 18, this clamping action being supplied by nut 22.

As a further and important feature of the present invention, outer race 20 is securely locked for joint rotation with hub 14, and this is here accomplished by threading a ring nut (means 23) into the upper end of bearing wall 16 in surrounding relation to sleeve 51 and which is threaded down into compressive abutment with the adjacent upper end of outer race 20. Sealing washer 32 is here secured by nut 23 and which functions to engage sleeve 51 so as to seal off the upper end of the bearing space between the races. At the opposite lower end of the assembly, shaft 17 is formed with an external shoulder 58 for supporting the inner race, and hub wall 16 is formed with an internal shoulder 59 to support the outer race. One or more sealing washers 33 and 34 are secured between outer race 20 and wall shoulder 59 and extend inwardly to engage shaft 17 to seal off the normally lower end of the bearing space between the inner and outer races. Conventional roller bearing members 61 are mounted between the inner and outer races; and to facilitate assembly, the outer race 20 is divided into two separate sections which are assembled on opposite sides of a spacer ring 62.

Preferably a pair of roller bearings of the type described and having inner and outer races of a common diameter are mounted in concentric alignment with the inner races 19 and 19a at shaft 17 and outer races 20 and 20a at hub wall 16. A pair of concentric spacer rings 66 and 67 are mounted between the adjacent ends of the inner and outer races respectfully and in abutment therewith so as to provide solid, locked through, connections between the inner and outer races of the upper and lower disposed bearings. The lower end of bearing race 19a is here seated on shaft shoulder 58 while the lower end of outer race 20a is seated on the top of two spacer rings 71 and 72 which are stacked together and are supported on the inturned bottom flange or shoulder 59 of the wheel hub. Sealing washer 33 is here clamped between spacer rings 71 and 72, while sealing washer 34 is clamped between sealing ring 72 and flange 59. Again, in the case of the lower roller bearing, the outer race 20a is divided into two sections which are separated by a spacer ring 73; and the upper sealing ring 32 is clamped between a spacing ring 74 mounted in abutment between ring nut 56 and the upper end of outer ring 20. As additional oil seal precautions, O-rings 31 and 35 complete the sealing of the assembly, O-ring 31 being carried by shaft 17 for engagement with sleeve 33 and O-ring 35 being mounted for sealing the confronting ends of hub flange 59 and shaft 17. Some clearance is provided between the outer periphery of sleeve 51 and ring nut 23 to provide free rotation.

As a principal feature of the present invention and as hereinabove noted, the inner and outer races of the bearings are solidly locked to the stationary shaft and rotating wheel respectively and are thus protected against resisting loads for which they are not designed. On the contrary, by holding these parts firmly in place, the loads on the bearings are confined to those for which the bearings are designed and capable of functioning substantially indefinitely. The solid assembly of parts is made up, reading from top to bottom of the drawings, at the inner races of the bearings, of nut 22, top mounting plate 11, sleeve 51, the inner race 19 of the upper bearing, spacer ring 66, and the inner race 19a of the lower bearing seated on shaft shoulder 58. A similar locked up assembly is provided for the outer races of the bearings, reading from top to bottom of the drawing the parts include ring nut 23, oil seal 32, supporting ring 74, the upper and lower sections of the outer race of the uppr bearing separated by spacer ring 62, spacer ring 67, the two sections of the outer race of the lower bearing separated by spacer ring 73, spacer ring 71, sealing ring 33, spacer ring 72, and sealing ring 34 supported on hub flange 59. As will be observed, nuts 22 and 23 may be tightened securely without in any way transferring stress or strain to the roller bearings. In former structures, tightening of such nuts applied pressure directly to one or both of the bearing races, squeezing these parts together and creating heat and premature wear. In the present case no matter how much pressure is applied by nuts 22 and 22, the operation of the bearing is unaffected and they are supported to run freely.

Another of the important features of the present invention is the self-lubricating characteristics of the structure. Oil entered at the upper receiving opening 38 in the shaft will flow downwardly to cross passages 41 and 42 and thence radially to aligned passages 77 in supporting ring 66. It will be noted that ring 66 is of somewhat smaller diameter than the interior of surrounding ring 67 so as to leave a space 78 therebetween from which the oil may flow into the bearing areas of the upper and lower bearings between their respective inner and outer races. The provision and disposition of the several seals as above described effectively retains oil within the bearings for long periods of time thus requiring infrequent addition of oil.

Another feature of the present invention is that the structure depicted is such as to fit existing wheels of cable car systems thus permitting the modification of all of the existing wheels to the present structure. It will be understood that these wheels are intended for mounting under ground where water, dirt and other contaminates may normally find access to the bearings. It is a further feature of the present structure to effectively preclude the entry of any such matter to the bearings. While the wheel will typically be mounted for rotation in a horizontal plane, the mounting structure of the present invention may be used with the wheel running in any other plane, such as in a vertical plane.

What is claimed is:

1. In a wheel mounting having a pair of spaced apart supports and a wheel having a hub, said hub having an internal wall surrounding and journaled for rotation on a shaft mounted between said supports, said shaft having a normally vertical axis in use and said wheel having a substantially horizontal plane of rotation, the improvement comprising:

a bearing having concentric spaced apart inner and outer races mounted at said shaft and hub wall respectively and roller bearing members mounted between said races;

said shaft having one end fixed to one of said supports and an opposite end extending through said other support.

a sleeve surrounding said shaft and having its opposite ends positioned for engagement with said other support and an adjacent end of said inner race;

means connecting said opposite shaft end and said support and urging said support to displace said sleeve against said adjacent end of said inner race to lock said inner race and shaft against relative movement;

means clamping said outer race to said hub for rotation with said wheel;

conduit means positioned for introducing lubricating oil to the space between said races, said conduit means extending longitudinally in said shaft and having an oil receiving opening at the normally upper end of said shaft and at least one radially extending passage for discharge of oil into said space; and sealing means providing oil retention in said bearing.

2. The structure of claim 1, said connecting means comprising a nut threaded on said opposite shaft end externally of and in compression against said other support and said clamping means comprising a ring nut surrounding said sleeve and threaded on said hub wall in compressive abutment with an adjacent end of said outer race.

3. The structure of claim 2, and a sealing washer secured by said nut and engaging said sleeve to seal off the upper end of said space.

4. The structure of claim 3, said shaft having an external shoulder to support said inner race, and said hub wall having an external shoulder to support said outer race.

5. The structure of claim 4, and a sealing washer secured between said outer race and wall shoulder and engaging said shaft to seal off the normally lower end of said space.

6. The structure of claim 5 comprising a pair of said bearings having inner races of common diameter and outer races of common diameter and mounted in concentric alignment with said inner races at said shaft and said outer races at said wall;
   a spacer ring mounted between adjacent ends of said inner races and in abutment therewith, and being ported for flow of oil into the spaces between the inner and outer races of said bearings; and
   said connecting means providing a locked connection of said other support and sleeve and outer races and said shaft shoulder.

7. The structure of claim 6, said hub wall having an internal shoulder;
   a second spacer ring mounted between adjacent ends of said outer races and in abutment therewith and concentric to and spaced from said first-named spacer ring to provide an oil passage therebetween; and
   said ring nut providing a locked connected of said outer races and said wall shoulder.

8. The structure of claim 7, and a sealing ring mounted between said wall shoulder and adjacent outer race and engaging said shaft to seal off the lower end of said space.

9. The structure of claim 8, and an O-ring mounted in sealing engagement with said wall shoulder and said shaft.

10. The structure of claim 9, and an O-ring mounted in sealing engagement with said sleeve and shaft.

11. The structure of claim 10, said outer races each being formed of two sections; and
    spacer rings mounted between said sections and providing continuity of support between said ring nut and said hub wall shoulder.

* * * * *